US00RE33893E

United States Patent [19]

Elias et al.

[11] E Patent Number: Re. 33,893

[45] Reissued Date of Patent: Apr. 21, 1992

[54] RECLOSABLE CLOSURE ASSEMBLY FOR CONTAINER

[75] Inventors: Terri A. Elias; Stephen G. Szegda, both of St. Paul, Minn.

[73] Assignee: Minnesota Mining and Manufacturing Company, St. Paul, Minn.

[21] Appl. No.: 570,003

[22] Filed: Aug. 20, 1990

Related U.S. Patent Documents

Reissue of:

[64] Patent No.: 4,781,323
Issued: Nov. 1, 1988
Appl. No.: 882,377
Filed: Jul. 7, 1986

U.S. Applications:

[63] Continuation-in-part of Ser. No. 769,698, Aug. 27, 1985.

[51] Int. Cl.[5] ..... B65D 5/70

[52] U.S. Cl. ..... 229/123.3; 220/258; 220/259; 229/125.15; 229/125.19

[58] Field of Search ..... 229/123.1, 123.2, 123.3, 229/125.11, 125.14, 125.15; 220/269-271, 359; 493/87, 102, 347, 382

[56] References Cited

U.S. PATENT DOCUMENTS

| | | | |
|---|---|---|---|
| Re. 25,938 | 12/1965 | Mobley | 229/123.1 |
| 2,336,706 | 12/1943 | Sunderhauf . | |
| 2,532,011 | 11/1950 | Dahlquist et al. . | |
| 2,607,711 | 8/1952 | Hendricks . | |
| 2,738,916 | 3/1956 | Peters . | |
| 3,101,879 | 8/1963 | Meyer-Jagenberg . | |
| 3,104,793 | 9/1962 | Hickin . | |
| 3,127,082 | 3/1964 | Meyer-Jagenberg | 229/123.3 |
| 3,133,689 | 5/1964 | Rossi . | |
| 3,292,828 | 12/1966 | Stuart . | |
| 3,318,852 | 5/1967 | Dixon . | |
| 3,355,059 | 11/1967 | Balocca et al. . | |
| 3,389,827 | 6/1968 | Abere et al. . | |
| 3,552,631 | 1/1971 | Fuchs | 229/123.1 |
| 3,568,910 | 3/1971 | McConnell . | |
| 3,613,986 | 10/1971 | Christensson . | |
| 3,616,114 | 10/1971 | Hamaguchi et al. . | |
| 3,687,352 | 8/1972 | Kalajian . | |
| 3,720,732 | 3/1973 | Sevenich . | |
| 3,848,594 | 11/1974 | Buell . | |
| 3,883,034 | 5/1975 | Rausing . | |
| 3,896,965 | 7/1975 | Cornell . | |
| 3,977,591 | 8/1976 | Martensson et al. | 229/123.1 |
| 3,990,603 | 11/1976 | Brochman . | |
| 4,163,506 | 8/1979 | Patterson . | |
| 4,223,789 | 9/1980 | Reil | 229/123.3 |
| 4,312,450 | 1/1982 | Reil | 229/123.2 |
| 4,372,460 | 2/1983 | Brochman et al. | 220/258 |
| 4,405,056 | 9/1983 | Patterson | 220/271 |
| 4,461,605 | 7/1984 | Stanek et al. | 413/8 |
| 4,464,154 | 8/1984 | Ljungerantz | 493/87 |
| 4,500,011 | 2/1985 | Brochman | 220/258 |
| 4,595,116 | 6/1986 | Carlsson | 220/359 |
| 4,792,069 | 12/1988 | Nantin et al. | 229/125.15 |

FOREIGN PATENT DOCUMENTS

| | | |
|---|---|---|
| 0004932 | 10/1979 | European Pat. Off. . |
| 568898 | 11/1975 | Switzerland . |

OTHER PUBLICATIONS

"Combibloc: An Aseptic System That Uses Preformed Carton Blanks," Dieter Richter, Packaging Technology, Mar./Apr. 1983, pp. 22-25.

Concerns Over Consumers Preoccupy Aseptipak '85, Packaging, Jul. 1985, pp. 80-84.

*Primary Examiner*—Gary E. Elkins

*Attorney, Agent, or Firm*—Gary L. Griswold; Walter N. Kirn; David L. Weinstein

[57] ABSTRACT

Reclosable closure assembly for containers, particularly aseptic containers, containers having such a closure assembly, and a method for applying the closure assembly to preformed blanks suitable for preparing the containers.

The container portion to which the closure assembly is applied has an opening, i.e., a pour hole. An exterior tape having a backing and an adhesive layer is attached to the [exterior] container [wall] so as to cover the pour hole. A protective tape having a barrier layer and an adhesive layer is firmly bonded to the interior container wall so as to cover the pour hole. A target tape having an adhesive layer and a layer of release coating material on a backing is disposed between the exterior tape and the exterior container wall. The target tape has an opening coincident with the pour hole. The protective tape is firmly bonded to the exterior tape in the area of the pour hole and coincident opening in the target tape by means of the adhesive layers on the exterior tape and on the protective tape. The layer of release coating material of the target tape can come in contact with the adhesive layer of the exterior tape so that the exterior tape can be releasably adhered to the target tape and may be removed from and reclosed over the pour hole.

12 Claims, 3 Drawing Sheets

RECLOSABLE CLOSURE ASSEMBLY FOR CONTAINER

Matter enclosed in heavy brackets [ ] appears in the original patent but forms no part of this reissue specification; matter printed in italics indicates the additions made by reissue.

BACKGROUND OF THE INVENTION

This application is a continuation-in-part of U.S. patent application Ser. No. 769,698, filed Aug. 27, 1985.

This invention relates to containers having reclosable closure systems, more particularly aseptic containers suitable for packaging liquids.

Aseptic packaging is a technique for creating a shelf-stable container for food (and in some cases pharmaceuticals) by placing a commercially sterile product into a commercially sterile container. The technique offers an alternative to retorting and to frozen or refrigerated distribution of foods; it offers advantages of wider packaging material choice, improved product quality and the ability to create some bulk packages that could not be filled using other techniques.

In the last few years, the packaging of juices and other non-carbonated beverages in aseptic containers, especially paperboard containers, has become widespread. Generally, these containers hold a single serving, e.g., eight ounces, and access to and the consumption of the contents thereof is effected by means of a staw. Although the single-serving containers have achieved success in the marketplace, the structure of their closure system makes their adoption for multiple-serving containers undesirable. Multiple-serving containers demand the capability of being reclosed in order to prevent degradation of the contents by atmospheric oxygen. In the case of fruit juices as with most other food products, oxygen is the prime factor in the degradation of flavor, color, and nutritional quality. Oxygen permeates into the package during the shelf life of the product.

It has also been learned that the single-serving, straw-accessed containers are not preferred by adults, who prefer to pour the contents of the container into a cup or glass for further consumption. The small size of the straw access aperture is also a hindrance to pouring.

Finally, the act of puncturing the container by means of a straw frequently leads to squirting of the contents outside of the container onto objects or persons in proximity to the consumer.

The prior art describes several types of reclosable containers. See for example, U.S. Pat. Nos. 2,336,706, 3,104,793, 3,133,689, 3,568,910. However, none of these containers is particularly well-suitable for use as aseptic containers for liquids.

U.S. Pat No. 3,616,114 discloses reusable, composite, adhesive sealing tapes for releasably interconnecting container parts and the like, such as corrugated boxes, paper bags, etc. The tapes, cut to a suitable length and width, include at least two tape portions or laminations, namely a main tape portion and a partly coplanar reinforcing tape portion.

The inner end of the reinforcing portion is firmly attached to the midportion of the main portion. The latter has a first area adapted to be attached to one side of a first container part, while a second area thereof, including its free end, is adapted to be attached to a second container part which should be releasably interconnected with said first container part; the reinforcing portion is at least partly attachable to the opposite side of the first container part. A turned-up section formed from the inner end of the reinforcing portion may constitute a hinge for said first area of the main portion when it is attached to the respective container part. Although this tape appears to be suitable as a reclosable closure for liquid-filled containers, it does not address the problem of substances in the juices reacting with the pressure-sensitive adhesive or the problem of seepage of liquid into the piles of a paperboard container via the cut edges of the opening.

U.S. Pat. No. 4,372,460 discloses an easy opening closure system comprising a container end portion having an opening therein, an exterior tape which comprises a backing and a pressure-sensitive adhesive layer and is situated circumjacent the opening; and a protective tape which comprises a barrier layer that provides a barrier to essential oils contained in beverages and an oil-resistant thermoplastic adhesive layer, the protective tape being firmly bonded to the bottom surface of the container end portion circumjacent the opening by means of the thermoplastic adhesive layer and to the exterior tape in the area of the opening by means of the pressure-sensitive adhesive layer and the thermoplastic adhesive layer. However, this closure does not address the problem of reclosability.

SUMMARY OF THE PRESENT INVENTION

This invention involves a readily reclosable container suitable for aseptic packaging of liquids. The present invention provides a reclosable closure assembly for a container having an interior wall portion, an exterior wall portion, and an opening therein, said closure assembly comprising:

(a) an exterior tape having a backing and a pressure-sensitive adhesive layer, said exterior tape *completely* covering said opening[, with said pressure-sensitive adhesive layer of said exterior tape attached to said exterior wall portion of said container completely around said opening];

(b) a protective tape comprising a barrier layer and an adhesive layer, e.g., a pressure-sensitive adhesive layer, firmly bonded to said barrier layer, said protective tape being firmly bonded by the adhesive layer of said protective tape to said interior wall portion of said container and completely around said opening, said protective tape further being firmly bonded to said exterior tape in the area of said opening by means of said pressure-sensitive adhesive layer of said exterior tape and said adhesive layer of said protective tape, and (c) a target tape including a backing, a layer of release coating material on one major surface of said backing, and an adhesive layer on the other major surface of said backing, said target tape having an opening coincident with said opening in said container and being disposed between said exterior tape and said exterior wall portion of said container with said layer of release coating material adjacent said exterior tape so that said exterior tape is releasably adhered to said target tape and may be easily removed and resealed to said target tape.

The closure assembly of the present invention combines the desirable properties of essential oil-resistance, easy-opening, reclosability, and oxygen-impermeability.

The closure assembly of the present invention is particularly suitable for packaging natural juice and artificial drink products which contain essential oils such as d-limonene and may be used with products packed in aseptic containers.

DETAILED DESCRIPTION

Figure 1:
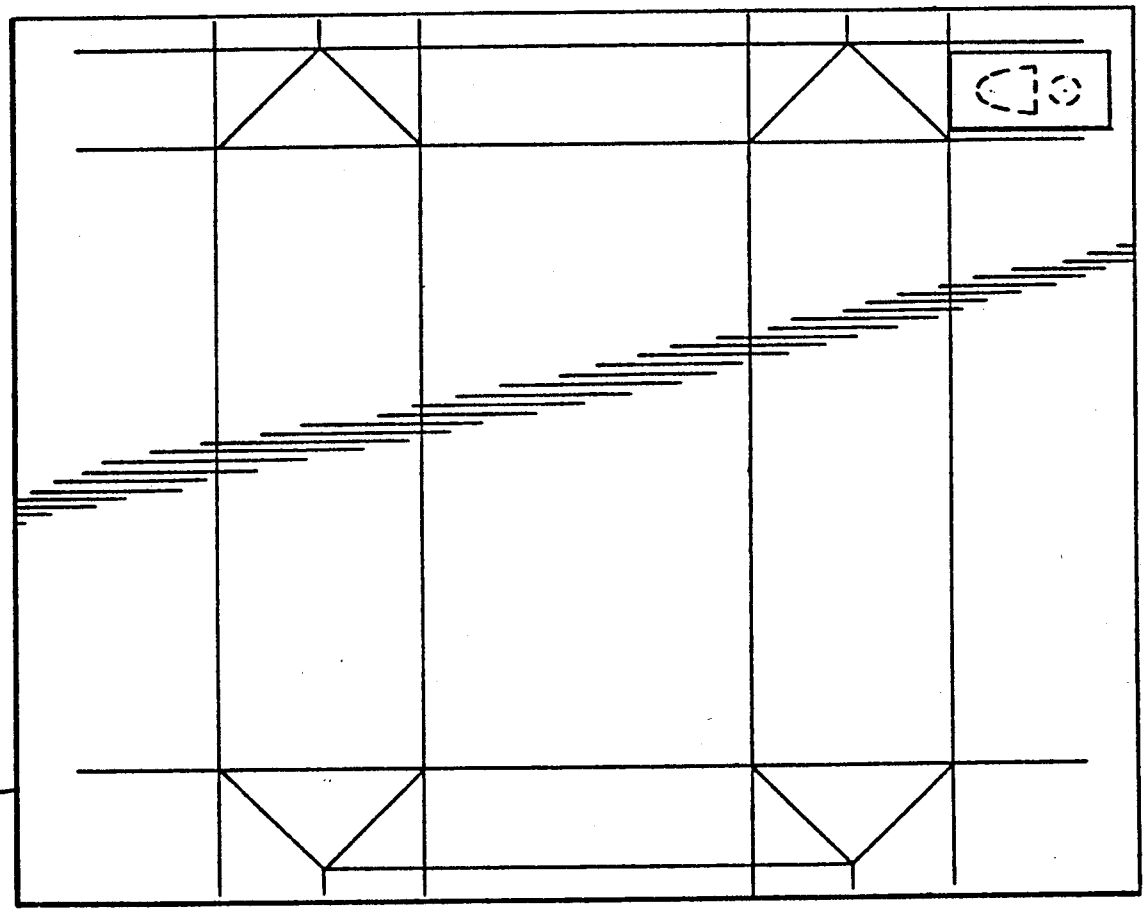
FIG. 1 shows a plan view of a blank suitable for making an aseptic package having the closure of this invention.
Figure 3:
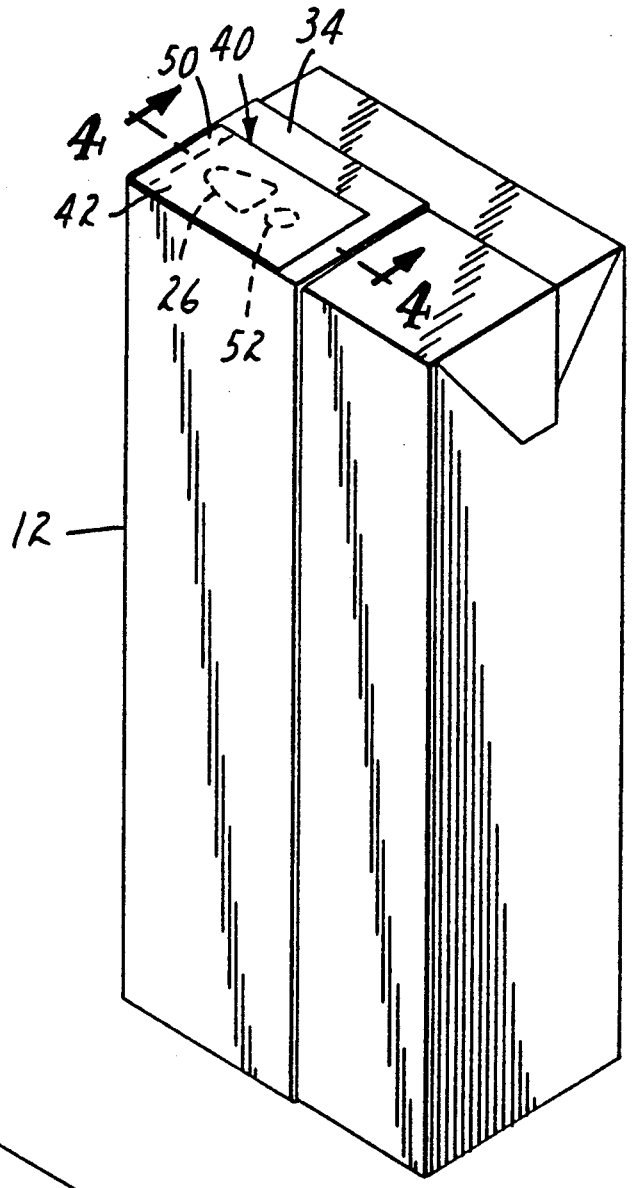
FIG. 3 shows a perspective view of a parallelipipedal package that has been completely assembled.
Figure 2:
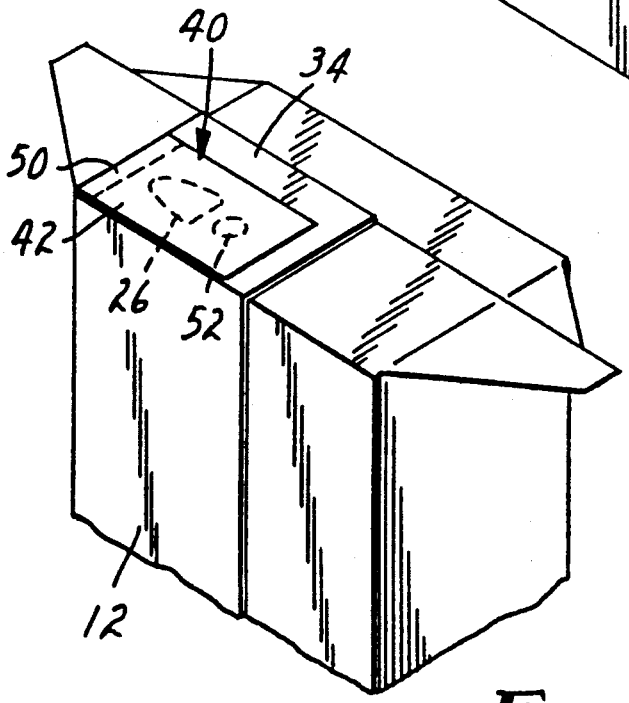
FIG. 2 shows a perspective view of a parallelipipedal package that has not yet been completely assembled.

Referring to the drawings in detail, a typical carton blank is designated generally by the numeral 10 in FIG. 1. The blank 10 is preferably made of semiflexible sheet material, for example, paperboard such as used in making juice cartons. A typical blank comprises, from exterior layer to interior layer, a layer of polyethylene, a layer comprising four plies of paper board, a layer of aluminum foil, and a layer of "Surlyn". "Surlyn" is a matrix of hydrocarbons in which are embedded relatively short polyethylene chains and granules of polymethacrylate linked with sodium ions. The interior layer forms the surface which contacts the contents of the container. The exterior layer forms the surface which contacts the surrounding atmosphere. This type of blank is being used in the Combibloc aseptic packaging system, which consists of preformed blanks manufactured by PKL GmbH of Dusseldorf, West Germany. The packaging system is more fully described in an article entitled "Combibloc: An aseptic system that uses preformed carton blanks", Dieter Richter, Packaging Technology, March/April 1983, incorporated herein by reference. Aseptic packages that can be assembled with this blank are well-known in the art. Such a package is designated by the numeral 12 in FIG. 2 and FIG. 3. Typically, the aseptic package is assembled by automated machinery. It is to be understood that the closure assembly to be described below is not limited to containers formed from the blank of FIG. 1, but can be used with any aseptic package of any size, so long as the portion of the package to which the closure is attached is flat.

Protective tape 20 comprises a barrier layer 22 which is firmly adhered to the interior wall portion 24 of the container 12 adjacent pour hole 26 by means of a an adhesive layer 28, preferably a pressure-sensitive adhesive layer. Target tape 30 comprises a backing 32 which is firmly adhered to the exterior wall portion 34 of the container 12 by means of an adhesive layer 36, preferably a pressure-sensitive adhesive. On the surface of backing 32 opposite the adhesive layer 36 is a layer of release coating material 38, e.g, low adhesion backsize. Exterior tape 40 has a backing 42 and a pressure-sensitive adhesive layer 44 by means of which layer the exterior tape 40 can be releasably adhered to the release layer 38 of target tape 30. Preferably, a small portion 46 of target tape 30 is turned up at one end and firmly attached to one end of exterior tape 40. The advantage of this preferred construction is that exterior tape 40 will not delaminate the exterior wall portion 34 of container 12. Target tape 30 has an opening 48 therein which is coincident with pour hole 26. The barrier 22 of protective tape 20 is firmly adhered to exterior tape 40 in the area of pour hole 26 by means of adhesive layer 44 of exterior tape 40 and adhesive layer 28 of protective tape 20. Also illustrated is grip portion 50 of exterior tape 40 which comprises a strip of film 51 adhered to exterior tape 40 in order to prevent that portion of exterior tape 40 from adhering to target tape 30. Additionally, the grip portion 50 of exterior tape 40 may be embossed (not illustrated) in a manner which facilitates gripping of exterior tape 40.

Figure 4:
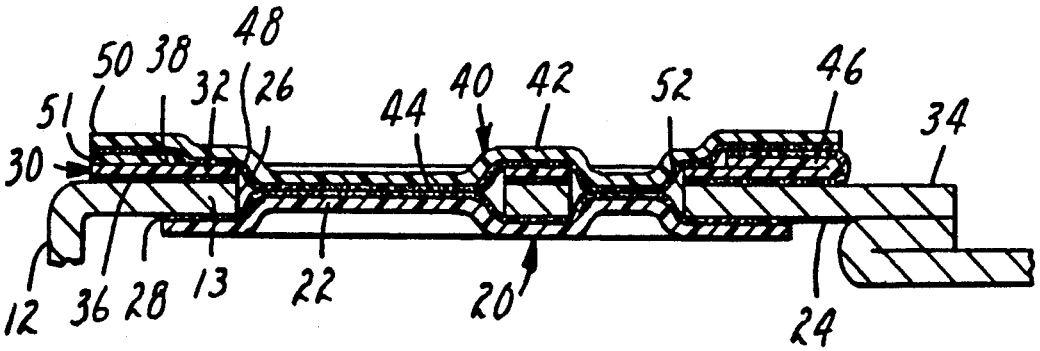
FIG. 4 is a section view taken along line 4—4 of FIG. 3.
Figure 5:
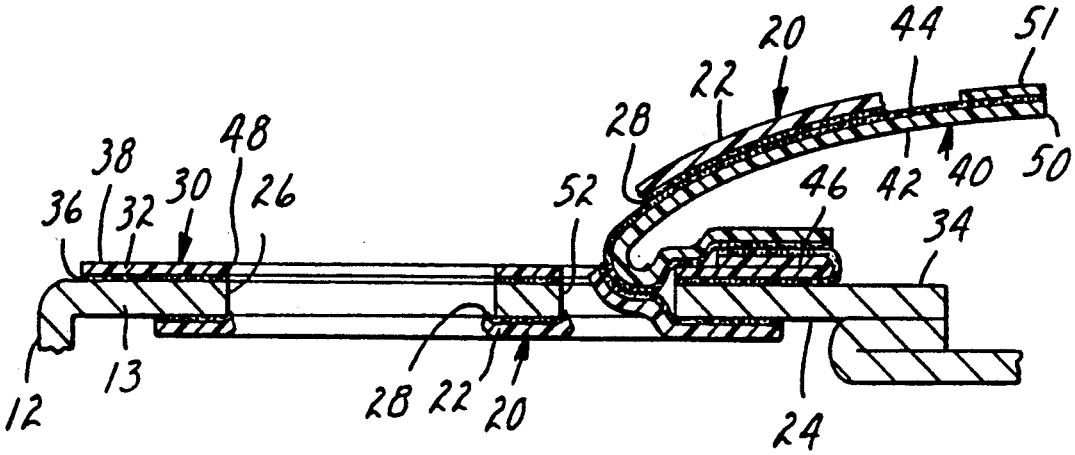
FIG. 5 is a section view similar to FIG. 4 after opening of the container has begun.

When it is desired to open the closure assembly depicted in FIGS. 4 and 5, the consumer simply grasps grip portion 50 of exterior tape 40 with his fingers and pulls that grip portion 50 in any direction away from container 12. As exterior tape 40 is removed from the portion of protective tape 20 in the area of pour hole 26, barrier layer 22 is removed with it. To reclose container 12 for use at a later time, exterior tape 40 is merely readhered to target tape 30.

It is also preferred that container 12 contain a vent hole 52 in addition to pour hole 26 in order to facilitate pouring of the liquid contents of container 12. As with pour hole 26, adhesive layer 44 of exterior tape 40 and adhesive layer 28 of protective tape 20 must be firmly adhered to each other in the area of vent hole 52, and target tape 30 must have an opening 54 coincident with vent hole 52.

Pour hole 26 may be of any shape and size so long as it permits a level of bonding between exterior tape 40 and protective tape 20 which will assure retention of aseptic conditions. The shape and size of vent hole 52 must also conform to this requirement. A preferred pour hole 26 has a area of about 100 to about 200 square millimeters. The shape illustrated in the drawings has been found to be suitable.

The purpose of exterior tape 40 is to provide means for sealing the contents of container 12 from atmospheric oxygen. Exterior tape 40 may comprise the various materials which are well known in the art to tape backings, adhesives, primers, and the like. Particular suitable materials for exterior tapes which can be used as container closures have been described In U.S. Pat. Nos. 3,389,827 (Abere et al) and 3,990,603 (Brochman), incorporated herein by reference, and discussed below.

Backing 42 of exterior tape 40 preferably will be up to about 30 mils (750 micrometers) in thickness and it should be capable of being pulled back upon itself without rupture. As a practical matter backing 42 should have a uniform thickness across its width and along its length. For convenience of removal of adhesive layer 44 from target tape 30, backing 42 should neither break nor elongate more than 25% under a tension of 2 pounds (0.9 kg).

Representative materials which have been found suitable as backing members include tough plastic films which have been oriented and heat-set in manners which are well known in the art in order to impart requisite properties of toughness and heat-resistance. Suitable films include polyethylene, polypropylene, polyethylene, terephthalate, polytetramethylene terephthalate, polytetramethylene terephthalate, polycarbonate, 6-6, Nylon (e.g., that available under trade designation "Zytel ST 801 HS" from E. I. duPont de Nemours Co.), physical blends of polytetramethylene terephthalate/polyethylene, physical blends of polytetramethylene terephthalate/polyethylene terephthalate, physical blends of polytetramethylene terephthalate/-phenoxy, glycol modified polyethylene terephthalate, unplasticized polyvinylchloride, polyethylene terephthalate/polyethylene composites and films derived from a graft copolymer comprising acrylonitrile/methylmethacrylate copolymer grafted onto an acrylonitrile/butadiene copolymer backbone (e.g., that available under the trade designation "Barex" from Vistron Corporation). A particularly suitable film is a 2-mil (50 micrometer) biaxially-oriented film of polyethylene terephthalate, the film also containing a polycarbonate slip agent of the type disclosed in U.S. Pat. No. 3,720,732 (Sevenich), incorporated herein by reference. Other representative materials include thin metal foils (e.g., aluminum, steel, etc.) as well as metal foil-film composites.

Preferred pressure-sensitive adhesives for layer 44 are the block copolymer-containing adhesives described in said U.S. Pat. No. 3,389,827. Preferred block copolymers are those having the general configuration A-B-A, wherein each A is a thermoplastic polymer block having a glass transition temperature above room temperature and having an average molecular weight between about 5,000 and 125,000 and B is a polymer block of a conjugated diene having an average molecular weight between about 15,000 and 250,000.

One particularly suitable pressure-sensitive adhesive of this type comprises 100 parts by weight of "Kraton 1101" (a block copolymer of styrene and butadiene having one butadiene polymer block of 70,000 molecular weight and two styrene polymer blocks of 15,000 molecular weight, commercially available from Shell Chemical Company), 76 parts by weight of "Piccolyte A-135" (an alpha-pinene resin, commercially available from Hercules Chemical Company) and 0.8 parts by weight of "Ethyl Antioxidant 330" (1,3,5-trimethyl-2,4,6-tris[3,5-deteriorate-butyl-4-hydroxybenzyl]benzene, commercially available from Ethyl Corporation.

Other suitable pressure-sensitive adhesives include the acrylic copolymer-containing adhesives described in said U.S. Pat. No. 3,389,827. A particularly suitable adhesive of this type comprises an isooctyl acrylate (90)/acrylic acid (10) copolymer which has been cross-linked through addition of benzoyl peroxide in an amount of about 0.01 to 0.5 percent by weight of the acrylic copolymer.

Tapes useful as exterior tapes 40 preferably have the shear characteristics described in aforementioned U.S. Pat. No. 3,389,827.

Backing 42 can be rendered opaque by means of pigmentation of said backing as the backing is extruded, by means of vapor coating the tape backing with a thin layer of metal (e.g., aluminum, silver, copper, etc.) or by means of coating a dispersion of pigment onto the tape backing. A vapor coat may be desirable since it functions to improve the impermeability (e.g., to air and moisture) of backing 42. It is preferred that the closure assembly be as impermeable to atmospheric oxygen as the remainder of container 12. In order for the closure to perform in the desired manner when utilized for aseptic packaging, it is sufficient that the oxygen impermeability of the closure assembly be 0.7–1.0 cc/100 square inches, as measured by ASTM D385 (1984). A typical aseptic package has an oxygen impermeabaility value of about 0.025 cc/100 square inches. Backing 42 vapor coated with aluminum has been found to be useful in permitting the closure to meet the oxygen permeability requirement. In the case of a vapor coat, it is often desirable to apply a top coat over the vapor coat in order that the latter be protected from any abrasion which can cause an undesirable appearance of the tab. One particularly useful material for a topcoat is "Vitel PE 222", discussed above as also being a suitable primer.

The purpose of protective tape 20 is to prevent the contents of the container 12 from migrating into the plies of the papaerboard which form the container body and discoloring same.

Barrier layer 22 of protective tape 20 provides a barrier to the essential oils contained in a particular juice or drink product. While functioning as a barrier, barrier layer 22 must also have properties which permit it to be torn and removed in the area of pour hole 26 when exterior tape 40 is pulled to expose pour hole 26. Thus, the tear strength of barrier layer 22 should not exceed the strength of bond between exterior tape 40 and protective tape 20. Also, the tear strength of barrier layer 22 should not exceed the strength of the bond between barrier layer 22 and adhesive layer 28 of protective tape 20. Barrier layer 22 may be, for example, about 0.1 to 2 mils in thickness. A barrier layer of about 0.25 to 1 mils in thickness is preferred in the practice of the present invention.

Suitable materials for barrier layer 22 of protective tape 20 include plastic films comprising copolymers of vinylidene chloride and vinylchloride (e.g., the film available under the trade designation "Saran Wrap" from Dow Chemical Company), and films comprising copolymers of vinylidene chloride and acylonitrile (e.g., the resin available under the trade designation "Saran F-310" from Dow Chemical Company). A preferred barrier layer 22 is prepared form an aqueous dispersion of latex (e.g., the dispersion available under the trade designation "Saran Latex XD-30373" from Dow Chemical Company).

Other suitable materials for barrier layer 22 include thin metal foils (e.g., those comprising aluminum or tin) or metal foil-film composites.

Adhesives suitable for adhesive layer 28 of protective tape 20 must be resistant to the oil (e.g., essential oils) contained in the product being packaged in order to provide suitable bonding performance. Generally, an adhesive coating of about 0.5 to 3 mils in thickness is suitable in the practice of the present invention.

Preferred adhesives for adhesive layer 28 of protective tape 20 can be selected from those pressure-sensitive adhesives that are preferred for adhesive layer 44 of exterior tape 40.

When the pressure-sensitive adhesive is to be applied to an intact barrier layer 22, the adhesive may simply be extrusion coated or solvent-cast onto the layer. When an aqueous dispersion such as the above-mentioned "Saran Latex XD-30373" is employed to prepare barrier layer 22, it has been found convenient to first extrude the pressure-sensitive adhesive onto a carrier web such as a 1 or 2 mil (25 or 50 micrometers) untreated, biaxially-oriented polypropylene film and to then coat the resulting adhesive layer with the latex dispersion with a Mayer bar of rotogravure coater. The carrier web functions as a carrier substrate during tape manufacture and as a removable liner.

A preferred protective tape comprises a 0.5 mil (12.5 micrometers) barrier layer prepared from the above-mentioned "Saran Latex XD-30373" and a pressure-sensitive adhesive layer prepared the previously described composition containing 100 parts by weight "Kraton 1101" copolymer, 76 parts by weight Piccolyte A-135resin, and 0.8 parts by weight "Ethyl Antioxidant 330".

While pressure-sensitive adhesives are preferred for layer 28 of protective tape 20, thermoplastic adhesives can also be used.

The purpose of target tape 30 is to provide the surface to which the reclosable portion of the exterior tape 40 is releasably adhered. In the preferred embodiment, target tape 30 also serves to firmly attach the exterior tape 40 to container 12.

Target tape 30 comprises a backing 32, one major surface of which bears a layer 36 of adhesive, preferably pressure-sensitive adhesive, the other major surface of which bears a layer 38 capable of releasably adhering exterior tape 40. Backing 32 preferably will be up to about 3 mils and most preferably about 1 to 2 mils in thickness. Backing 32 of the target tape 30 can be selected from the same materials that are suitable as backings 42 for exterior tape 30. Preferred materials for 5 backing 32 for the target tape 30 are polypropylene and polyester.

Figure 6:
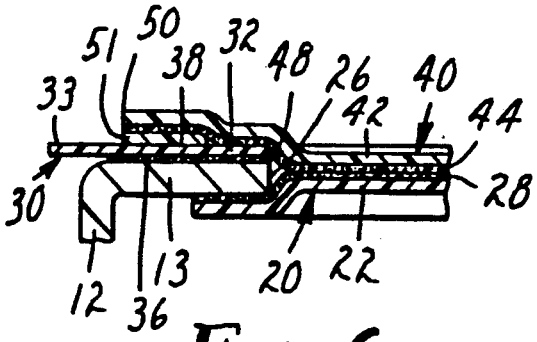
FIG. 6 is a partial section view similar to FIG. 4 showing an extension of the target tape.

It is preferred that one end of the backing 32 of the target tape 30 extend beyond the container top panel 13 to which the target tape 30 is attached (see FIG. 6) to form an extended portion 33. Such an extended portion 33 prevents the liquid that is being poured from the container 12 from dribbling down the side of the container. The length of the extended portion 33 of the backing 32 can vary and its optimal length is dependent upon the height of the container, and configuration of the pour hole 26. For a typical container, e.g. one having a height of about 9 inches and a capacity of about 64 ounces, the extension can range from about 1/16 inch to about ¼ inch. The material forming the backing 32 of the target tape 30 should be sufficiently rigid so that the extended portion 33 thereof will have sufficient strength to resist the force of the liquid as it is being poured out of the container. Pouring edges having a shape similar to that of the pouring edge contemplated for use herein are described, for example, in U.S. Pat. Nos. 4,113,103 and 4,126,263, incorporated herein by reference.

Adhesives suitable for the adhesive layer 36 of target tape 30 are preferably pressure-sensitive adhesives. Pressure-sensitive adhesives suitable for adhesive layers 36 are the same as those that are suitable as pressure-sensitive adhesives for exterior tape 40. An example of a preferred pressure-sensitive adhesive for adhesive layer 36 or target tape 30 is a conventional block copolymer system similar to those described in U.S. Pat. No. 3,239,478. Other types of adhesives e.g. thermoplastic adhesives, can be used for adhesive layer 36.

Preferred release coating materials for layer 38 include conventional low adhesion backsize compounds, hereinafter alternatively referred to as LABs. Representative examples of conventional low adhesion backsize compounds suitable for use in this invention are fully described in U.S. Pat. Nos. 2,607,711, 2,532,011, and 3,318,852, all of which are incorporated herein by reference.

U.S. Pat. No. 2,607,711 describes LABs formed of a copolymer of an ester of the class consisting of higher alkyl acrylates and methacrylates wherein the higher alkyl radical has a length of at least 12 carbon atoms, and an acid of the class consisting of acrylic acid and methacrylic acid. The acrylic acid or methacrylic acid can be replaced in part by another copolymerizable ethylenic monomer, e.g., acrylonitrile or methacrylonitrile.

U.S. Pat. No. 3,318,852 described LABs formed of a copolymer derived from an ethylenically unsaturated monomer containing a functional group forming a conjugated system with the ethylenic linkage wherein between about 10 and about 90 mole percent of the polymerized units of the copolymer contain a free carboxylic acid group as the functional group forming the conjugated system and all other functional groups forming the conjugated system are hydrolyzable to a free carboxyl acid group, and 20–90 percent by weight of monomeric units derived from an ethyleneically unsaturated monomer containing a fluoroalkyl group of at least six carbon atoms. The solubility of the copolymer can be enhanced by the use of a third comonomer, also ethylenically unsaturated, containing a functional group which forms a conjugated system with its unsaturated bond and is hydrolyzable to a carboxyl group. Each of the monomers contributes to the overall properties of the copolymer.

U.S. Pat. No. 2,532,011 describes LABs comprising polyvinyl carbamate polymers wherein the carbamate side chains terminate with an alkyl group more than five carbon atoms in length, and preferably at least 14. These can be made by reacting polyvinyl alcohol with an appropriate isocyanate having a terminal alkyl group. An example is polyvinyl N-octadecyl carbamate, made by reacting polyvinyl alcohol and octadecyl isocyanate, which has 18 carbon atoms in the nitrogen-bonded side chain alkyl groups. These LABs are most preferred for the present invention.

Target tape 30 preferably will be up to about 5 mils, and most preferably about 3 to 4 mils, in thickness.

Protective tape 20, target tape 30, and exterior tape 40 and all of the components of these three tapes must be non-toxic. Currently, the components of the aforementioned tapes must be approved by the Food and Drug Administration.

The closure assembly illustrated in FIGS. 4 and 5 allow a shelf-life for the contents of the container of up to about one year, without the necessity of refrigeration.

The closure assembly of the present invention provides several advantages over reclosable closure systems of the prior art. First the system provides a container for liquids that is reclosable. Second, the protective tape eliminates the possibility of liquids permeating the plies of the paperboard stock, thus assuring retention of the aesthetic qualities of the container. Third, the exterior tape/target tape reclosable composite reduces oxygen permeation of the container, thus allowing freshness of the contents for periods of time of up to one year. Fourth, the closure assembly reduces the likelihood of the contents squirting about randomly upon opening the container, compared to puncture-type closures.

The elements of the closure assembly can be applied to the blank by hand, but are preferably applied by means of conventional tape applicators that are known to those skilled in the art. The preferred method of application is as follows:

(1) Target tape 30 is applied to the exterior layer of blank 10 in the appropriate position. End 46 of target tape 30 is turned up and covered with a liner (not shown).

(2) Pour hole 26 is formed through blank 10 and target tape 30, preferably by means of a conventional punch device. If a vent hole 52 is employed, it is also formed at this time.

(3) Protective tape 20 is applied to the interior layer of blank 10 circumjacent the pour hole 26 (and vent hole 52, if applicable).

(4) The covering liner is removed from target tape 30, and then the appropriate end of exterior tape 40 is attached to the target tape 30.

(5) The closure assembly is subjected to a vacuum in order to draw adhesive layer 44 of exterior tape 40 and adhesive layer 28 of protective tape 20 in the area of pour hole 26 (and vent hole 52, if applicable) closer together.

(6) The adhesive layer 44 of exterior tape 40 and adhesive layer 28 of protective tape 20 in the area of pour hole 26 (and vent hole 52, if applicable) are heat bonded, preferably at about 350° F. (176° C.) for 0.3 to 0.5 seconds, in order to provide a tight seal between the exterior tape 40 and protective tape 20.

Steps (5) and (6) are highly preferable in order to provide a strong bond between exterior tape 40 and protective tape 20. Alternative methods for providing the effect of steps (5) and (6) can be employed in lieu of vacuuming and heat bonding.

Various modifications and alterations of this invention will become apparent to those skilled in the art without departing from the scope ad spirit of this invention, and it should be understood that this invention is not be be unduly limited to the illustrative embodiments set forth herein.

What is claimed is:

1. A reclosable closure assembly for a container, which container comprises at least one panel having an interior wall portion, an exterior wall portion, and an opening in said panel, said closure assembly comprising:

(a) an exterior tape having a backing and a pressure-sensitive adhesive layer, said exterior tape *completely* covering said opening[, with said pressure-sensitive adhesive layer of said exterior tape attached to said exterior wall portion of said panel completely around said opening];

(b) a protective tape comprising a barrier layer and an adhesive layer firmly bonded to said barrier layer, said protective tape being firmly bonded by the adhesive layer of said protective tape to said interior wall portion of said panel and completely around said opening, said protective tape further being firmly bonded to said exterior tape in the area of said opening by means of said pressure-sensitive adhesive layer of said exterior tape and said adhesive layer of said protective tape, and (c) a target tape including a backing, a layer of release coating material on one major surface of said backing, and an adhesive layer on the other major surface of said backing, said target tape having an opening coincident with said opening in said panel and being disposed between said exterior tape and said exterior wall portion of said panel with said layer of release coating material adjacent said exterior tape so that said exterior tape is releasably adhered to said target tape and may be easily removed and resealed to said [exterior wall portion of said panel] *target tape,* said backing of said target tape being of a length so as to extend beyond the panel to which said target tape is attached.

2. A reclosable closure assembly according to claim 1 wherein said target tape includes a folded end whereby a portion of said adhesive layer of said target tape is exposed and attached to said adhesive layer of said exterior tape so that said exterior tape may be removed from said opening while remaining firmly attached to said container.

3. A reclosable closure assembly according to claim 1 wherein said container further has a vent opening and said target tape has an opening coincident with said vent opening.

4. A reclosable closure assembly according to claim 1 wherein the backing of said exterior tape bears a metallic coating.

5. A reclosable closure assembly according to claim 1 wherein the layer of release coating material on said target tape comprises a low adhesion backsize compound.

6. A reclosable closure assembly according to claim 1 wherein the adhesive layer of said target tape comprises a pressure-sensitive adhesive.

7. A reclosable closure assembly according to claim 1 wherein the adhesive layer of said protective tape comprises a pressure-sensitive adhesive.

8. Container comprising at least one panel having an interior wall portion, an exterior wall portion, and an opening in said panel, said container having a reclosable closure assembly comprising (a) an exterior tape having a backing and a pressure-sensitive adhesive layer, said exterior tape *completely* covering said opening[, with said pressure-sensitive adhesive layer of said exterior tape attached to said exterior wall portion of said panel completely around said opening];

(b) a protective tape comprising a barrier layer and an adhesive layer firmly bonded to said barrier layer, said protective tape being firmly bonded by the adhesive layer of said protective tape to said interior wall portion of said panel and completely around said opening, said protective tape further being firmly bonded to said exterior tape in the area of said opening by means of said pressure-sensitive adhesive layer of said exterior tape and said adhesive layer of said protective tape, and (c) a target tape including a backing, a layer of release coating material on one major surface of said backing, and an adhesive layer on the other major surface of said backing, said target tape having an opening coincident with said opening in said panel and being disposed between said exterior tape and said exterior wall portion of said panel with said layer of release coating material adjacent said exterior tape so that said exterior tape is releasably adhered to said target tape and may be easily removed and resealed to said [exterior wall portion of said panel] *target tape,* said backing of said target tape being of a length so as to extend beyond the panel to which said target tape is attached.

9. A container according to claim 8 wherein said container is an aseptic package.

10. Method for applying a reclosable seal to a container blank comprising steps of:

applying target tape to a first side of said container blank, said target tape having an adhesive layer attached to said container, a backing attached to said adhesive layer and a layer of release coating material attached to said backing opposite said adhesive layer;

forming at least one hole through said target tape and said container blank;

applying an exterior tape to said target tape, said exterior tape having a backing and a layer of adhesive in contact with said layer of release coating material of said target tape and being disposed to cover said container hole; and applying a protective tape to said container blank on the side opposite the side bearing said target tape and said exterior tape, said protective tape having a barrier layer and a layer of adhesive bonded to said barrier layer and said container blank, said protective tape being disposed to cover said hole, and said layer of adhesive of said protective tape further being bonded to said exterior tape through said hole.

11. The method of claim 10 further comprising the step of folding said target tape prior to applying said exterior tape thereto to expose a portion of said layer of adhesive of said target tape for attachment to said layer of adhesive of said exterior tape.

12. The method of claim 10 wherein a pour hole and an adjacent vent hole are formed through said target tape and said container blank.

[13. A reclosable closure assembly according to claim 1 wherein one end of said backing of said target tape extends beyond the wall of the container.]

* * * * *

UNITED STATES PATENT AND TRADEMARK OFFICE

CERTIFICATE OF CORRECTION

PATENT NO. : Re. 33,893

DATED : April 21, 1992

INVENTOR(S) : Elias et al.

It is certified that error appears in the above-identified patent and that said Letters Patent is hereby corrected as shown below:

Col. 1, line 31, "staw" should be --straw--.

Signed and Sealed this

Twenty-ninth Day of March, 1994

Bruce Lehman

*Attest:*

BRUCE LEHMAN

*Attesting Officer*

*Commissioner of Patents and Trademarks*